United States Patent Office 2,925,452
Patented Feb. 16, 1960

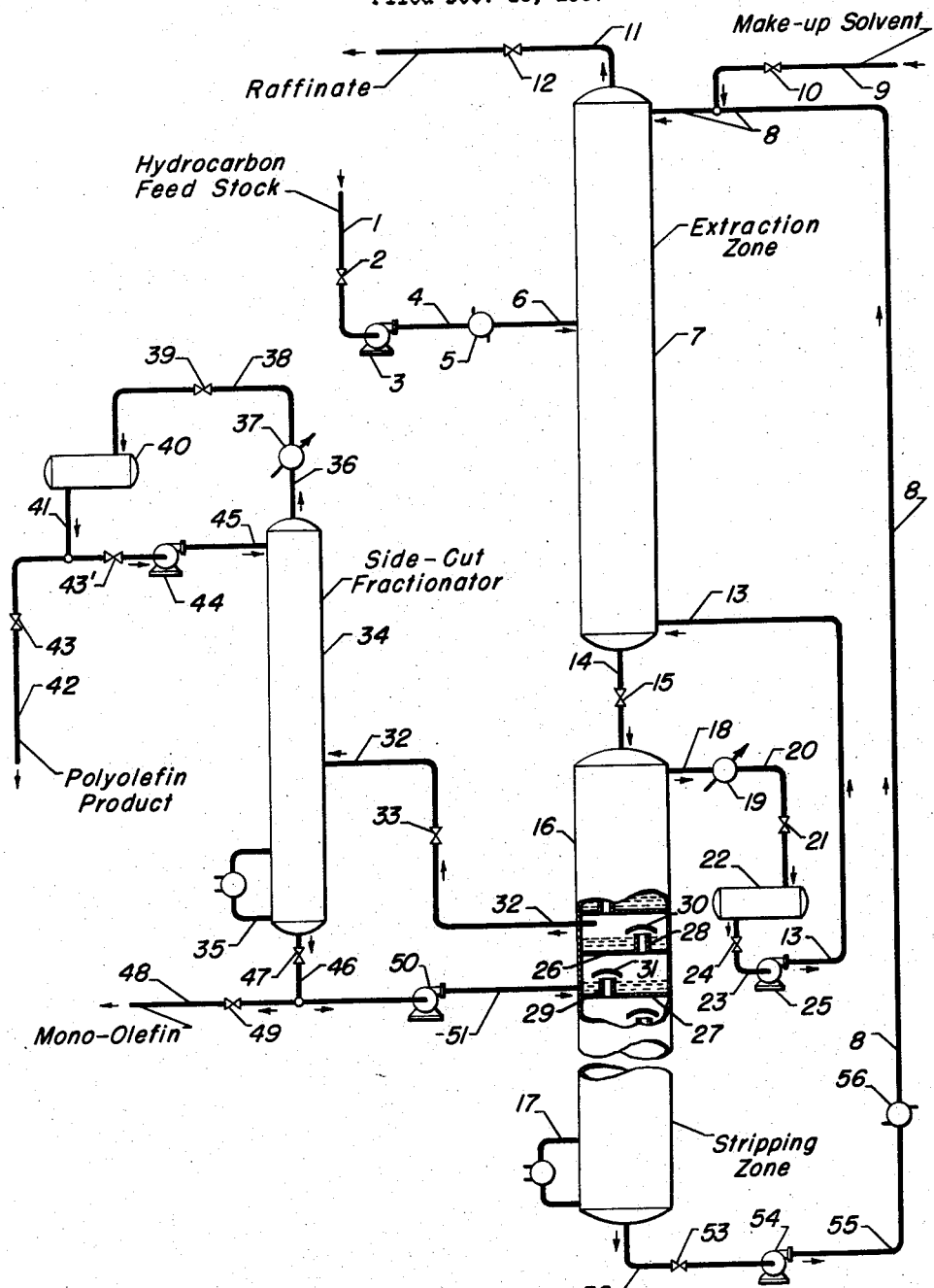

2,925,452

SEPARATING OLEFINIC HYDROCARBONS

Donald B. Broughton, Chicago, Ill., assignor, by mesne assignments, to Universal Oil Products Company, Des Plaines, Ill., a corporation of Delaware Application December 18, 1957, Serial No. 703,629

7 Claims. (Cl. 260—681.5)

This invention relates to a process for recovering dienes from hydrocarbon mixtures containing the same in admixture with more saturated analogs and homologs thereof. More specifically, this invention concerns a multistage hydrocarbon separation process comprising a solvent extraction stage, a rich solvent stripping stage and a side-cut fractional distillation stage for separating the components of a hydrocarbon mixture containing a diene and at least one class of hydrocarbon selected from the mono-olefins and paraffins of substantially the same boiling point, in which process the volatility of the individual classes of hydrocarbons comprising the mixture in the presence of and in the absence of a solvent selective for one of the components is utilized to segregate analogous components of substantially the same boiling point.

One object of this invention is to separate a diene hydrocarbon from a hydrocarbon mixture containing the same and at least one other class of hydrocarbons selected from the mono-olefins and aliphatic paraffins. Another object of the invention is to separate substantially pure butadiene from a hydrocarbon mixture containing in addition to said butadiene, at least one of the group consisting of one or more butylenes and one or more butanes.

In one of its embodiments this invention relates to a process for recovering a substantially pure diolefinic hydrocarbon from a mixture of hydrocarbons having a narrow boiling range which comprises contacting said mixture with a solvent selectively miscible with unsaturated hydrocarbons in an extraction zone at conditions of temperature and pressure sufficient to maintain said solvent and said mixture in substantially liquid phase, separating a raffinate phase comprising a relatively saturated hydrocarbon substantially insoluble in said solvent from a rich solvent containing in solution the relatively unsaturated components of said mixture, separately subjecting said rich solvent to extractive distillation, recovering an overhead from said extractive distillation comprising a hydrocarbon of intermediate unsaturation, introducing said overhead into the lower portion of said extraction zone, below the point of introducing said mixture into said zone, recovering a bottoms from said extractive distillation comprising lean solvent substantially free of hydrocarbon, removing a side-cut vapor from said extractive distillation, separately subjecting said side-cut vapor to fractional distillation in the substantial absence of solvent, recovering an overhead from said fractional distillation enriched with diolefin, relative to the concentration of diolefin in said mixture, recovering a liquid bottoms from said fractional distillation and introducing said liquid bottoms into said extractive distillation at a point below the side-cut vapor withdrawal.

Other embodiments relating to the recovery of the components of the mixture having intermediate unsaturation, specific solvents and specific hydrocarbon mixtures, as well as other factors involved in the present process will be referred to in greater detail in the following further description of the invention.

Hydrocarbon mixtures utilizable as feed stocks in the present process are selected from those mixtures containing a significant proportion of dienes or polyolefins, in admixture with one or more mono-olefins, and/or paraffins which may be of aliphatic or naphthenic structure, the process being particularly applicable to substantially constant boiling mixtures of such components containing individual isomers, homologs and analogs which boil at or near the same boiling points and which are generally difficult to separate by other known methods. Typical hydrocarbon mixtures to which the present process is especially adapted and which present special problems in separation are the $C_4$ hydrocarbon mixtures comprising butadiene and one or more of the $C_4$ hydrocarbon analogs, including normal butane, isobutane, 1-butene and cis- and trans-2-butene, the separation of which into individual components structural classes is especially difficult because of their close boiling points and their tendency to form azeotropic or constant boiling mixtures upon distillation. The feed stock to the process may be derived from any suitable source, such as an appropriately boiling fraction of the light condensable gases of a catalytic or thermal cracking process; as the product of a paraffin dehydrogenation process containing a mixture of various isomers; as a fraction of a Fischer-Tropsch product in which carbon monoxide is condensed with hydrogen to form, among other types and classes of organic compounds, hydrocarbons of various molecular weights including $C_4$, $C_5$ and $C_6$ dienes, mono-olefins, and paraffins; as the dehydration product of a normal or iso-aliphatic alcohol and from numerous other sources well-known to the art. Because of the close proximity of their boiling points, the isomers and analogs present in these fractions cannot be readily separated into relatively pure products, such as an individual diene. Various extraction and extractive distillation procedures, utilizing a variety of solvents have been heretofore proposed by the prior art, the separations being based upon whatever differences there may be in the solubility of the various component hydrocarbons in the solvent; however, such processes require the use of extensive extraction equipment and many more contacting stages than is theoretically required to effect the separation on the basis of the differences in the boiling points of the components of the mixture. In other instances the process may result in the separation of only relatively impure fractions of the desired product which may not be the product purity required for specialty uses thereof. The present process is intended to produce a substantially pure diene product from hydrocarbon mixtures which may contain any proportion of the individual isomers and analogs of the diene and by suitable control of the process conditions, products of intermediate unsaturation may also be separated in relatively pure form.

Although the present separation process is particularly directed to the separation of aliphatic $C_4$–$C_6$ hydrocarbon mixtures, the process may also be adapted to the separation of cyclic dienes from aliphatic olefins and/or paraffins, such as the separation of cyclopentadiene from cyclopentane and/or cyclopentene. In each instance the particular hydrocarbon mixture utilized as feed stock in the process may require the selection of a particular solvent especially adapted, because of its solubility and boiling point, to the feed stock supplied in the process.

The solvents employed in the extraction stage of the present process are selected from certain organic compounds which, in general, are selectively miscible with the unsaturated components of the hydrocarbon feed stock and which do not dissolve to any appreciable extent the paraffinic components, if present. In addition to the foregoing selectivity characteristic of the solvent for the unsaturated component or components of the feed stock mixture, the solvent generally must have a boiling point substantially in excess of the feed stock to thereby remain in substantially liquid phase during the extraction and stripping stages of the process, preferably a boiling point of at least 30° C. above the boiling point of the least volatile component of the feed stock mixture. Typical illustrative examples of organic compounds useful as selective solvents herein include the alcohols, such as methanol, ethanol, n-propanol, isopropanol and higher homologous monohydric alcohols, generally up to and including octanol and its isomers; the glycols, such as ethylene glycol, propylene glycol, butylene glycol, and amylene glycol, trimethylene carbinol, glycerol, etc.; phenols, such as phenol itself, one or more of the cresols and xylenols, such as ortho-, meta-, or para-methylphenol, 3,5-dimethylphenol, 2,6-dimethylphenol, etc., alpha-naphthol, beta-naphthol, etc.; ethers, such as di-isopropyl ether, di-n-butyl ether, di-isoamyl ether, etc.; the glycol-ethers, such as diethylene glycol, dipropylene glycol, the dimethyl ether of ethylene glycol, triethylene glycol, tripropylene glycol, α,α'-dihydroxy ethylpropyl ether, methylphenolate, etc.; nitriles, such as β,β'-oxydipropionitrile; esters, such as glycol diacetate, etc.; ketones, such as acetone, methylethyl ketone, diethyl ketone, phenylmethyl ketone, diphenyl ketone, di-isopropyl ketone and other members of the aliphatic ketone series; aldehydes, such as acetaldehyde, propionaldehyde, furfural, benzaldehyde, etc.; and other organic solvents having selective solubilizing properties for olefinic hydrocarbons in the presence of paraffins. One of the preferred classes of solvents for the present diene extraction process, particularly suitable for the recovery of high purity diene extracts are the alcohols and ketones of relatively low molecular weight such as acetone, methylethyl ketone, diethyl ketone, and alcohols such as methanol and ethanol, as well as the glycol ethers, such as diethylene glycol, dipropylene glycol, mixtures of diethylene and dipropylene glycol, triethylene glycol, and polyalkylene glycols, preferably modified in their solvency and selectivity characteristics by the inclusion of from about 1% to about 50%, and more preferably, from about 5 to about 15% by weight of water in the solvent mixture. The presence of water in the solvent is particularly useful as a modifying agent in such water-soluble solvents as the alcohols, ketones and aldehydes. Thus, for example, aqueous methanol solutions containing from 5% to about 50% by weight of water, aqueous acetone solutions containing from 10% to about 50% by weight of water and ethylene glycol and diethylene glycol solutions containing from 2 to 25% by weight of water are particularly noteworthy examples of useful solvents in the present process.

The operation of the present process and its effectiveness as a means for preparing a substantially pure diene product depend upon certain relationships between the volatilities of the components in the feed stock in the presence and absence of a solvent and the relative solubilities of the components in their liquid state in the solvent. The following Table I indicates these relationships for a typical $C_4$ hydrocarbon feed stock, the values presented in said table being based upon actual observations of the volatilities and solubilities of the indicated $C_4$ components with respect to an organic solvent which is selectively miscible with unsaturated hydrocarbons and although the particular numerical values indicated in the following table are specific for a $C_4$ hydrocarbon mixture, substantially the same relative relationships exist with respect to the $C_5$ and $C_6$ dienes, mono-olefins and paraffins and also with respect to a wide variety of organic compounds commonly utilized as selective solvents, as heretofore indicated.

Table I

| | Boiling Points, °C. | Relative liquid solubility | Relative volat., in absence of solvent | Relative volat., in presence of solvent |
| --- | --- | --- | --- | --- |
| i-butane | −10.2 | 0.505 | 1.210 | 2.280 |
| n-butane | −0.6 to −0.3 | 0.505 | 0.870 | 1.650 |
| i-butylene | −6.0 | 0.732 | 1.070 | 1.430 |
| 1-butylene | −5.0 | 0.732 | 1.045 | 1.400 |
| trans-2-butylene | 2.5 | 0.732 | 0.842 | 1.125 |
| cis-2-butylene | 1.0 | 0.732 | 0.775 | 1.035 |
| butadiene | −3.0 | 1.000 | 1.000 | 1.000 |

It will be evident from an inspection of the data in Table I that the difference in selectivity of the solvent for the various components of the hydrocarbon mixture is relatively slight, such that processes for separating butadiene from the various butylenes and butanes utilizing conventional liquid-liquid extraction techiques require a large number of theoretical contact stages in order to obtain reasonable purification of the butadiene stream and even if a large number of contact stages are provided, the product is contaminated with relatively large proportions of transbutylene-2, principally because the volatility of transbutylene-2 in the presence and absence of the solvent quite closely approaches the same values for butadiene under the same conditions.

In vapor-liquid or extractive distillation types of separation processes, the distillation of butanes from butadiene or even from the butylenes is handicapped by the fact that the extractive effect of the solvent opposes the volatility differences between these hydrocarbons. The data of the above Table I indicate that vapor-liquid separations are more readily accomplished in the absence of the solvent. Accordingly, it has been customary in the prior art to separate 1-butene from the other components of the $C_4$ hydrocarbon mixture in a preliminary separation by simple fractional distillation and thereafter, subjecting the distillation residue to an extractive distillation type separation to thereby separate n-butane from butene-2. It is obvious that in such a proposed method of separation, as the experience of the prior art will substantiate the equipment requirements and the cost of operating such equipment is relatively high, because of the large number of units of equipment required for accomplishing both the fractional distillation and the extractive distillation stages of the process in separate units.

In the process provided by this invention, on the other hand, duplication of equipment is eliminated and the provision of a simple flow arrangement is one of the principal features of the process. The present process utilizes a combination of liquid-liquid extraction, partial extractive stripping of the rich solvent stream and rectification of the hydrocarbon vapors removed from the stripping zone in the substantial absence of solvent. The present process will be further described by reference to the accompanying diagram, which illustrates an arrangement of apparatus and a flow diagram for the solvent and hydrocarbon streams in a process for recovering a substantially pure diolefin product.

Referring to the drawing, a hydrocarbon feed stock containing a dienic hydrocarbon having from 4 to 6 carbon atoms, in admixture with isomeric paraffins, olefins and/or naphthenes, is introduced into the process flow through line 1 in amounts controlled by valve 2, being pumped from storage and compressed to a sufficient pressure by means of pump 3 to maintain the hydrocarbon feed stock in substantially liquid phase at the temperature maintained in the subsequent stages of the process, the hydrocarbon feed being transferred from pump 3 through line 4 into heat exchanger 5 wherein the feed stock is heated to the desired extraction temperature maintained in the subsequent solvent extraction unit of the process. For the purpose of simplifying the description of the process flow, identification of the individual streams encountered in the process and for defining the process conditions, the diagram will be described on the basis of utilizing a charge stock comprising a mixture of $C_4$ diolefins, mono-olefins and aliphatic paraffins, such as a mixture of n-butane, isobutane, butene-1, cis-butene-2, trans-butene-2, isobutylene and butadiene, it being understood that in thus designating a particular feed stock composition it is not thereby intended to limit the process to such a mixture nor to restrict the scope of the operating conditions and flow of fluids in the process merely to such $C_4$ hydrocarbon mixtures. Depending upon the particular solvent selected in the process, suitable temperatures may vary from —20° to about 150° C. and pressures may vary generally from atmospheric to pressures as high as 100 atmospheres, sufficient pressure being utilized in any event to maintain the feed stock and solvent in substantially liquid phase in the solvent extraction zone of the process. The feed stock at the latter temperature and pressure is withdrawn from heat exchanger 5 through line 6 and discharged into liquid-liquid phase solvent extraction zone 7, below the point of introducing the solvent which is generally charged into the top of the column, but above the point of withdrawing the resulting rich solvent or extract stream from zone 7. The solvent, which is generally of greater density than the feed stock, is charged into extraction zone 7 through an inlet in the upper portion of the column, being supplied from recycle sources through line 8, additional solvent for make-up purposes being charged into line 8 from solvent supply through line 9 in amount controlled by valve 10.

As the solvent composition flows downwardly through the extraction zone, the unsaturated components of the feed stock preferentially dissolve in the solvent composition, including all of the butadiene and at least a portion of the butene isomers, leaving substantially all of the paraffinic (e.g. butanes) components as a separate, insoluble liquid phase in the extraction zone. The undissolved hydrocarbon residue which comprises the raffinate phase present in the extraction column rises to the top of the column in countercurrent flow relationship to the descending solvent, being eventually removed from the process flow through line 11 and valve 12 to raffinate storage or to additional extraction equipment for separation of the components present therein.

The resulting rich solvent stream containing principally dissolved unsaturated $C_4$ hydrocarbons flows downwardly in column 7 into the lowermost rectification section of the column, being that portion of extraction column 7 below the hydrocarbon feed inlet. In the rectification section the rich solvent stream containing dissolved butadiene, as well as a significant proportion of butylenes, and at least a small portion of the butane components of the feed stock, as well (which although of much lesser solubility in the solvent than their unsaturated analogs, nevertheless dissolve to a slight extent in the solvent), is enriched with respect to the more unsaturated components by countercurrent contact with the rising stream of recycle reflux comprising preferentially soluble unsaturated $C_4$ hydrocarbons introduced into the lower portion of column 7 through line 13 from a source hereinafter more fully described. Because of the preferential solubility of the unsaturated hydrocarbons in the reflux stream, these components tend to displace from the rich solvent the more saturated compounds, such as the butanes, which are dissolved at least to a small extent in the rich solvent stream at the point of contact with the reflux. These butanes, as well as some of the butylenes, continue to rise in the extraction zone in countercurrent flow to the descending solvent stream and eventually are removed from the top of the extraction zone through raffinate outlet 11.

The rich solvent stream thus countercurrently washed with reflux and accumulating in the lower portion of extraction zone 7 is withdrawn from the bottom of zone 7 through line 14 in amounts controlled by valve 15 and thereafter introduced into the top of stripping zone 16 for recovery of the hydrocarbon solute present in said rich solvent.

Stripping zone 16 operates essentially as an extractive distillation column, the liquid stream introduced into the column being heated in the lower portion thereof by means of reboiler 17 which distills the hydrocarbon solute from the rich solvent, producing vapors which are countercurrently contacted in the upper portions of stripping zone 16 with descending rich solvent. Because of the volatility relationships between the various $C_4$ hydrocarbon in the presence of the solvent, the vapors stripped from the rich solvent are substantially enriched in mono-olefins and paraffins which may be present in the rich solvent in this stage of the process. Thus, as indicated in the foregoing Table I, any butanes which may remain in the rich solvent introduced into the stripping zone are the most volatile $C_4$ hydrocarbons in the presence of the solvent and are vaporized to a greater extent than the butylene components. Similarly, isobutylene would be relatively more volatile than 1-butene, and trans-2-butylene would be relatively more volatile than the cis-isomer. However, the difference in volatility between cis-butylene and butadiene in the presence of the solvent is not sufficient to effect complete separation between these components in the stripping section of the process. Accordingly, the vapors accumulating in the upper portion of stripping zone 16 contains a relatively greater proportion of the saturated components present in the rich solvent and, will also be enriched with the 1-butenes and isobutene. These hydrocarbons which are relatively volatile in the presence of the solvent are removed as a vapor overhead from the upper portion of column 16 through line 18, and are thereafter liquefied in condenser 19 from which they are withdrawn through line 20 and valve 21 into receiver 22. The butenes present in the thus vaporized overhead fraction from the extractive distillation or stripping zone constitute a desirable source of the recycle reflux stream to extraction column 7, since the butenes comprising this stream and which are relatively more soluble in the solvent than the butanes will serve to displace the latter butanes from the rich solvent stream in extraction zone 7 into the raffinate phase removed therefrom as an overhead stream. The condensed overhead vapors accumulating in receiver 22 are withdrawn by means of recycle pump 25 through line 23 in amounts controlled by valve 24, pump 25 discharging the recycle reflux stream into line 13 for return to zone 7, as aforesaid.

Although butadiene and the butene-2-isomers are the least volatile components of the hydrocarbon feed stock in the presence of the solvent and thus tend to remain dissolved in the solvent present in the extractive distillation or stripping zone 16 and, furthermore, are among the $C_4$ components having the greatest solubility in the solvent, these components cannot be readily separated as individual fractions from stripping zone 16 because of their close boiling points when distilled in the presence of the solvent. A substantial difference in the relative volatilities in the presence of the solvent of the trans-isomer compared to cis-butene-2 and butadiene isomers does, however, lead to the concentration of the trans-isomer in the overhead distillate from column 16 (removed through line 18) and the selective retention by the solvent of the cis-butene-2 isomer. By carefully controlling the vapor-liquid contacting conditions in column 16 and by providing a sufficient number of contact stages within zone 16, substantially all of the trans-isomer may be volatilized from the solvent into the overhead distillate fraction from zone 16 under the extractive distillation conditions maintained within the column. At some point in the lower portion of column 16, therefore, the composition of the vapor above the liquid layer at that particular level in zone 16 is substantially enriched with butadiene and cis-butene-2 isomer. Because of the substantially greater volatility of the hydrocarbon feed stock (relative to solvent, that is) the vapors at that point are substantially free of solvent. In accordance with the present process the vapors above the liquid phase in zone 16 at any intermediate level between the overhead take-off and the bottom of the column are withdrawn from column 16, being more preferably withdrawn from a tray in the middle of the column, and diverted into a side-cut fractionator which is provided as an integral portion of the process equipment, wherein the vapors are fractionally distilled in the substantial absence of solvent to effect a separation between the cis-butene-2 and butadiene analogs which constitute a major portion of the side-cut fraction.

Stripping zone 16 is illustrated in the accompanying diagram as a bubble plate vapor-liquid contacting zone wherein vapors generated in reboiling section 17 of the column are contacted with the liquid solvent compositions collected on each of the trays, which for purposes of illustration is shown in cut-away view as a series of super-adjacent and sub-adjacent plates or trays such as 26 and 27 having vapor risers 28 and 29 respectively, covered by bubble caps 30 and 31, respectively. The vapors generated in the lowermost portion of the stripping column by reboiler 17 rise through the column, passing said intermediate point, as for example, through riser 29, contacting liquid phase solvent composition collecting on tray 27, thereafter further ascending the column through riser 28 and through the liquid solvent composition collected on tray 26 as the solvent composition descends from a super-adjacent tray and overflows riser 28 onto tray 27. The vapors collecting above the liquid layer in said intermediate zone, for example above tray 28, are withdrawn through line 32 in the side of column 16 having an inlet in the vapor space above tray 28, said line 32 conveying the vapors into side-cut fractionator 34 in amounts controlled by valve 33 in line 32. Column 34 may be of any suitable, conventional design wherein partially condensed vapors are contacted with non-condensed vapors to effect fractionating thereof. It will be noted that since the solvent composition on tray 28 boils at a higher temperature than the hydrocarbons present in the vapor space above tray 28, the composition of the vapors withdrawn from above the liquid layer on tray 28 are substantially completely hydrocarbon in nature, although a small quantity of solvent may accompany the hydrocarbon vapors because of the partial pressure of the solvent; for all practical purposes however, fractionation in side-cut fractionator 34 is essentially effected in the absence of solvent. As the vapors generated in reboiler 35 of column 34 ascend through the column, partial condensation of these vapors occurs, forming a liquid phase condensate which descends into reboiling section 35 of the column wherein the liquid reflux is heated, vaporized, and fractionated as the vapors rise through the vapor-liquid contacting portion of column 34. It will be noted, from the data indicated in Table I, concerning the boiling points of the hydrocarbons in the absence of the solvent that of the hydrocarbons present in the side-cut vapors (that is, cis- and trans-butene-2 and butadiene) the butadiene component has a substantially lower boiling point than the butene-2 components. Accordingly, as the vapors in column 34 ascend through the vapor-liquid contacting section thereof, the vapors become progressively enriched with cis- and trans-butene-2 as the liquid condensate flows downwardly through the ascending vapors of higher temperatures. Provided with a sufficient number of such vapor-liquid contacting means, the overhead vapor from column 34, withdrawn through line 36, is substantially pure butadiene, the purity thereof depending upon the number of vapor-liquid contacting stages provided in the fractionating section of side-cut column 34 and the reflux ratio to the column, as hereinafter specified. The resulting overhead vapors are liquefied in condenser 37 and the resulting liquid condensate withdrawn through line 38 and valve 39 into butadiene condensate receiver 40 from which the diene product may be removed in controlled amounts determined by valve 43 through line 41, connecting with line 42, into storage, not illustrated. Preferably, at least a small portion of said liquid butadiene condensate is diverted from line 42 through valve 43' into pump 44 which recycles said withdrawn portion through line 45 as liquid reflux into the top of column 34, thereby providing further enhanced fractionation in column 34.

The higher boiling liquid which collects as bottoms in column 34 is substantially enriched with cis-butene-2 and contains any solvent carried with the vapor side-cut initially withdrawn from stripping column 16. The liquid bottoms is withdrawn from column 34 through line 46 in amounts controlled by valve 47 into line 48. In the event that a mono-olefin product comprising enriched cis-butene is desired as one of the products of the process, a portion of the liquid bottoms from side-cut fractionator 34 may be withdrawn from line 48 through valve 49. At least a substantial portion of said liquid bottoms, however, is returned to stripping zone 16 by means of pump 50 which discharges the liquid bottoms into line 51 connecting with the liquid layer accumulating on a tray sub-adjacent to the side-cut vapor withdrawal point (the point heretofore referred to as intermediate vapor withdrawal point) into the liquid layer accumulating on tray 27 for further extractive distillation in column 16. Any butadiene present in the liquid bottoms return is thus recovered by virtue of the extractive distillation which occurs in zone 16.

Reboiler 17 in extractive distillation column or stripping zone 16 effects substantially complete removal of any hydrocarbon solute present in the rich solvent composition which descends into the reboiling section of column 16, the liquid accumulating in the lower portion of column 16 consisting substantially entirely of stripped, lean solvent composition, suitable for recycle to the extraction stage of the present process. For purposes of recycle, the lean solvent composition is withdrawn from the reboiling section of column 16 into line 52 in amounts controlled by valve 53 and transferred by means of pump 54 into solvent recycle line 55. Depending upon the reboiler temperature and the desired solvent extraction temperature in column 7, the lean solvent may be either heated or cooled by passage through heat exchanger 56 in line 55 prior to recycle thereof to the extraction zone through lean solvent return line 8.

For the purpose of extracting most hydrocarbon, diene-containing feed stocks having from 4 to 6 carbon atoms, the extraction temperature maintained in zone 7 is desirably within the range of from about 0° to about 150° C. and for a $C_4$ hydrocarbon mixture containing butadiene, the preferred temperature for extraction is from about 10° to 50° C., the accompanying pressure being maintained at a level sufficient to maintain the solvent and hydrocarbon feed stock in zone 7 in substantially liquid phase, generally at pressures of from about 2 to about 50 atmospheres. In a preferred method of operation, the pressure in extraction zone 7 is maintained at a superatmospheric level with the temperature simultaneously maintained at a relatively high value, above the normal boiling point of the hydrocarbon feed stock, while the pressure maintained in stripping zone 16 is at a substantially lower value to thereby obtain isothermal stripping of the rich solvent stream entering into zone 16. Accordingly, pump 54 increases the pressure on the lean solvent stream recycled to the extraction zone at the relatively high level required in zone 7, while heat exchanger 56 raises its temperature to the substantially higher level required in zone 7, sufficient latent heat being thereby introduced into the lean solvent stream to provide sufficient heat to effect isothermal stripping at the reduced pressure in zone 16 when the rich solvent stream is withdrawn from zone 7 into zone 16.

The present combination process is further illustrated with respect to the foregoing embodiments in the following example which is directed to a process for recovering butadiene from a mixture of $C_4$ hydrocarbons comprising normal butane, isobutane, isobutylene, cis- and trans-butene-2 and butadiene, the ultimate product consisting of substantially pure butadiene.

The light overhead condensate of a butane-isobutane dehydrogenation process (in which a $C_4$-paraffin cut containing 33% isobutane was dehydrogenated by passage at a temperature of 140° C. over a catalyst consisting of alumina-chromia) was fractionated to separate a $C_4$ fraction boiling from —10° to about 3° C., the fraction containing the following components in their indicated proportions:

| Component: | Percent by weight |
|---|---|
| Isobutane | 10.1 |
| n-Butane | 8.6 |
| Butene-1 | 9.9 |
| Butene-2: | |
| Cis-isomer | 12.3 |
| Trans-isomer | 10.1 |
| Isobutylene | 21.2 |
| Butadiene | 26.5 |
| $C_5+$ | 1.3 |

The above cut is utilized as feed stock in a combination solvent extraction-rich solvent stripping-side cut fractionation process to recover the butadiene component thereof as the primary product.

The fraction is charged at a temperature of 30° C. and at a pressure of 120 lbs./in.$^2$ into a contacting column packed with ¼-inch ceramic paddles containing about 11 theoretical equivalent plates, the feed stock entering the column at about the mid-point of the packed section of the column. A solvent consisting of methanol containing 10% by weight of water, being the solvent residue of the rich solvent stripping step, hereafter described, is charged into the packed column at a solvent feed ratio of 11 volumes of solvent per volume of feed and at the foregoing temperature and pressure. A reflux fraction, having the following composition:

| | Percent |
|---|---|
| $C_4$ paraffins (isobutane n-butane) | 29 |
| $C_4$ mono-olefins | 63 |
| Butadiene | 8 | comprising the condensed overhead of the rich solvent stripping column, hereafter described, is charged into the bottom of the contacting column at the foregoing temperature and pressure and allowed to percolate upwardly through the packing, countercurrent to the descending rich solvent stream. A raffinate product having the following composition:

| Component: | Wt. percent |
|---|---|
| Isobutane | 18.0 |
| n-Butane | 15.5 |
| Butene-1 | 17.1 |
| Isobutylene | 38.0 |
| Butene-2 | 8.3 |
| Butadiene | 2.0 |
| $C_5+$ | 3.1 | is removed from the top of the extraction (contacting) column. The raffinate stream contains less than 1% by weight of solvent which is readily removed by countercurrently washing the raffinate with a small quantity of water in a packed contacting column, the recovered aqueous solvent being recycled to the solvent lines.

A rich solvent stream is removed from the bottom of the contacting or extraction zone and fractionally distilled in a bubble plate distillation column containing 35 trays which serves as a stripping zone and from which hydrocarbon extract is distilled as an overhead from the rich solvent, heat being introduced into the column by means of a reboiler coil near the bottom of the column. The hydrocarbon overhead is taken off from the top of the stripping column, liquefied by cooling and the resulting condensate allowed to accumulate in an overhead receiver. The overhead condensate comprising hydrocarbons enriched in $C_4$ mono-olefins and $C_4$ paraffins is diverted, as aforesaid, into the bottom of the contacting or extraction zone as recycle reflux therein.

The solvent residue which accumulates in the bottom of the stripping column is withdrawn therefrom and pumped at the pressure maintained in the extraction column (120 lbs./in.$^2$) through a heat exchanger which adjusts the temperature of the solvent to 30° C., the lean solvent stream at the foregoing temperature and pressure being recycled to the top of the extraction column for reuse as solvent.

A side-cut vapor is removed from the vapor space above tray 14 (14th tray from the top of the column) and charged into the lower portion of a side-cut fractionating column fitted with a reboiler in the lower portion of the column. A partial condensation of the vapors takes place upon entering the column which operates at a pressure of 90 lbs./in.$^2$ and at a somewhat lower temperature than the stripping column. Further fractionation of the vapors takes place as they rise through the packing in the column, the vapor overhead being condensed in a refrigerated cooler and the resulting liquid condensate collected in a receiver vessel leading from the condenser. Approximately 30% by volume of the liquid condensate is returned as reflux to the top of the packing in the column. The remainder of the condensate which is substantially pure butadiene (98+%) is withdrawn from the receiver as product.

The still bottoms are reboiled in the bottom of the column to provide a fractionating vapor, the non-vaporized residue being withdrawn from the bottom of the side-cut fractionator. A major portion of the latter residue (about 60% by volume) is recycled to the stripping column, being discharged into the liquid layer accumulating on the tray immediately beneath the tray from which the side-cut vapor is removed for removal to the side-cut fractionating column. A portion (about 12% by volume) of this liquid bottoms is solvent, included in the side-cut vapors. The remainder is hydrocarbon, insoluble in the solvent portion and consisting of substantially pure butene-2, a by-product of the process, of which about 85% by weight is the cis-isomer.

I claim as my invention:

1. A process for recovering a substantially pure diolefinic hydrocarbon from a mixture of hydrocarbons comprising a diolefin, a 1-olefin, a 2-olefin and a saturated hydrocarbon having the same number of carbon atoms per molecule, which comprises contacting said mixture with a solvent selectively miscible with unsaturated hydrocarbons in an extraction zone at conditions of temperature and pressure sufficient to maintain said solvent and said mixture in substantially liquid phase, separating a raffinate phase comprising a relatively saturated hydrocarbon substantially insoluble in said solvent at said conditions from a rich solvent containing in solution the relatively unsaturated components of said mixture, separately subjecting said rich solvent to extractive distillation in a distillation column, recovering a 1-olefin-containing overhead from the top of said distillation column, introducing said overhead into the lower portion of said extraction zone, below the point of introducing said mixture into said zone, recovering a bottoms from said extractive distillation comprising lean solvent substantially free of hydrocarbon, removing a side-cut vapor containing said diolefin and 2-olefin from an intermediate point in the height of said distillation column, separately subjecting said side-cut vapor to fractionation in the substantial absence of solvent to separate diolefin from 2-olefin, recovering from said fractionation an overhead enriched with diolefin, relative to the concentration of diolefin in said mixture, recovering a 2-olefin-containing liquid bottoms from said fractionation and introducing said liquid bottoms into said distillation column at a point below the side-cut vapor withdrawal and substantially above the bottom of the column.

2. The process of claim 1 further characterized in that said 2-olefin containing liquid bottoms is introduced into the said distillation column immediately below the point of withdrawal of said side-cut vapor.

3. The process of claim 1 further characterized in that said solvent is an organic compound having a boiling point higher than the boiling point of said mixture.

4. The process of claim 1 further characterized in that said solvent is a water-soluble alcohol containing from 5 to about 15% by weight of water.

5. The process of claim 3 further characterized in that said alcohol is methanol.

6. The process of claim 3 further characterized in that said solvent is an aqueous solution of acetone.

7. The process of claim 1 further characterized in that said hydrocarbon mixture comprises butadiene, a butane and butylenes.

References Cited in the file of this patent

UNITED STATES PATENTS

| | | |
|---|---|---|
| 2,407,820 | Durrum | Sept. 17, 1946 |
| 2,415,006 | Hachmuth | Jan. 28, 1947 |